United States Patent

[11] 3,575,156

[72] Inventor Leo W. Hosford
 8 La Cresenta Way, San Rafael, Calif. 94901
[21] Appl. No. 872,571
[22] Filed Oct. 30, 1969
[45] Patented Apr. 20, 1971

[54] PREPACKAGED FIRE AND DISPOSABLE BARBECUE
 10 Claims, 6 Drawing Figs.
[52] U.S. Cl. ................................................. 126/25
[51] Int. Cl. ........................................... A47j 37/00, F24b 3/00
[50] Field of Search .......................................... 126/9, 9 (A), 25, 25 (A), 25 (B); 110/1 (F)

[56] References Cited
UNITED STATES PATENTS

| | | | |
|---|---|---|---|
| 2,918,051 | 12/1959 | Broman | 126/9AUX |
| 2,981,249 | 4/1961 | Russell et al. | 126/9AUX |
| 3,353,527 | 11/1967 | Anderson | 126/9AUX |
| 3,370,582 | 2/1968 | Rauh | 126/9AUX |
| 3,491,743 | 1/1970 | Temp | 126/9A |

FOREIGN PATENTS

| | | | |
|---|---|---|---|
| 604,511 | 9/1960 | Canada | 126/9A |

Primary Examiner—Charles J. Myhre
Attorney—Henry Gifford Hardy

ABSTRACT: A portable packaged barbecue intended for disposal after a single use, in which the basket for the fire is formed of woven wire mesh, open at the top with the top edge provided with suitable cuts so that may be folded inwardly. The basket is provided with three layers of material preferably, the bottom layer being quick-starting material such as excelsior, the middle layer being kindling such as wood chips, and the top layer being charcoal of almond to walnut size. The grill for the barbecue fits within the basket over the charcoal and when the top edges of the basket are turned inwardly, the same forms a solid package. The whole package may be encased in a paper bag or other flammable wrapping. Barbecuing is instantly prepared. The bag is lighted with a match to start and after the excelsior has burned, the edges are folded back and the grill removed. The edges are then bent inwardly to support the grill at the appropriate distance above the fire. At the end of use, the charcoal is allowed to burn out or doused, and the basket and grill disposed of.

PATENTED APR 20 1971
3,575,156
SHEET 1 OF 2
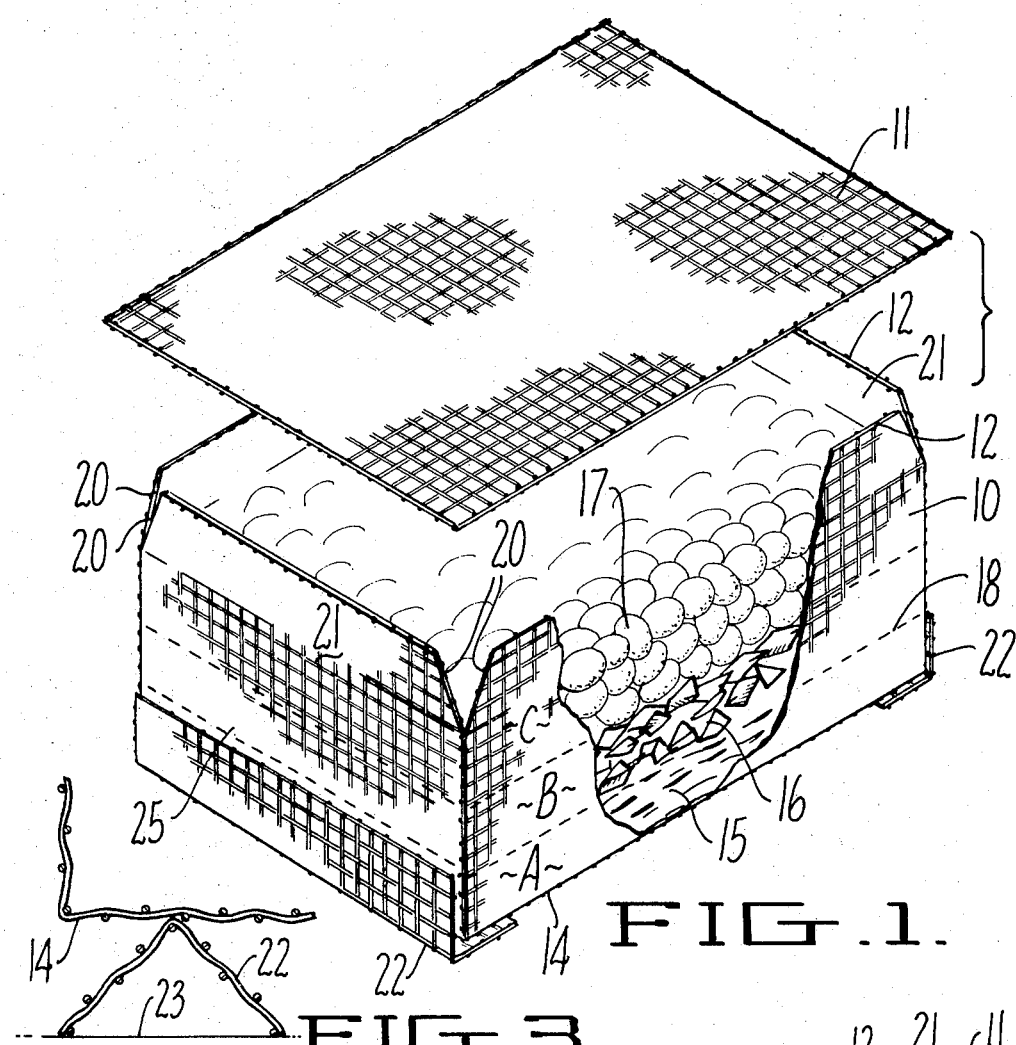
FIG.1.
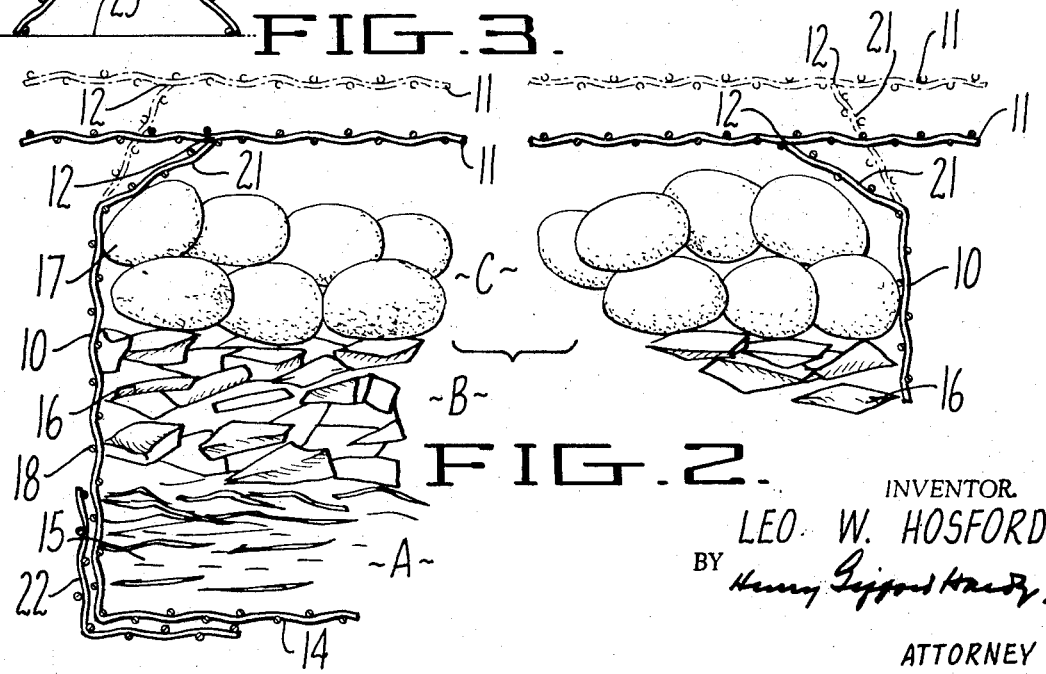
FIG.3.
FIG.2.
INVENTOR.
LEO W. HOSFORD
BY Henry Gifford Hardy
ATTORNEY

INVENTOR.
LEO W. HOSFORD
BY
ATTORNEY

PREPACKAGED FIRE AND DISPOSABLE BARBECUE

BACKGROUND OF THE INVENTION

Barbecuing is a source of much argument in the home, according to the analysts, and questions as to how soon the fire will be ready, what kind of fire is best, will the fire last long enough to do the required cooking and a host of other questions bring about animated discussions which cannot be satisfactorily answered because of the imponderables involved.

It is unfortunate, but true, that many persons do not know how to make a proper fire, and for the most part women do not care to do so. Further, the fire in the home barbecue unit frequently spreads or flattens out so that the heat is not concentrated for the cooking, or there is no proper bed for the fire and it goes out or falters. These are frequent causes of failure in barbecuing.

Although the mess and bother of preparing a barbecue fire for use have been matters to be reckoned with for some time, a search of the patent art has not revealed any real attempt to alleviate these problems. Anyone who has had experience with barbecuing knows that this is a dirty and messy mob with the clean-up afterwards equally dirty and messy. The problem of starting the barbecue has also been a problem and such things as electric lighters, igniting fluid, kindling and other means have been used, but it is at least a half an hour, and normally much longer, before the barbecue is ready for use. Also, much of the time too much charcoal is used and less frequently, too little charcoal is used to produce the fire required for the work at hand. The present invention overcomes the disadvantages of such prior methods and equipment by providing a portable, lightweight and completely disposable barbecue unit that may be used with greater facility than the present barbecue equipment with greater flexibility and in far less time.

SUMMARY OF THE INVENTION

The invention, as described, is a portable, disposable barbecuing unit which will produce the required barbecuing conditions within far less time and with none of the mess involved in handling charcoal, searching for kindling, the dangers of lighter fluid and all the other things which one must endure to enjoy the benefits and delights of barbecued food. The barbecue unit is formed in the shape of a basket, open at the top, in which there is excelsior and other quickly flammable material in the lowest portion, kindling or wood chips are in the middle portion, and above that is placed sufficient charcoal to accomplish the barbecuing intended. A separate wire cover serves as the grill. The separate bracket members may be inverted to form legs and the basket supported thereon to insure draft underneath the basket. This is not required where the bottom of the basket has formed depressions providing integral legs. The whole basket and its contents may be encased, if desired, in a paper wrapper or bag which can be ignited and burned up in starting the barbecue.

The physical and psychological sources of trouble are practically eliminated by the present invention. Since there is no need to know how to build a proper fire, anyone can barbecue, making this form of cooking available to women. Using the barbecue package, one knows that within less than 30 minutes the fire will be ready for cooking and that the fire will be at its cooking best for at least an hour after that time.

At the conclusion of the barbecuing, any remaining coals can be extinguished and the complete basket disposed of. It will be observed that this eliminates all the distasteful effort in preparation and cleaning of a barbecue and assuring that there is always a fresh grill upon which to barbecue, all with a minimum of waste and effort, little expense and a great saving of time and jangled nerves. If one can light a match, one can barbecue.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

BRIEF DESCRIPTION OF THE DRAWING

Referring to the drawings:

FIG. 1 is a perspective view of the complete barbecue package with the grill raised to show the underlying features;

FIG. 2 is vertical section taken on the line II—II of FIG. 1;

FIG. 3 is a fragmentary vertical section showing how the separate end angle pieces are used as legs for the barbecue unit;

DESCRIPTION OF THE PREFERRED EMBODIMENTS

Figure 4:
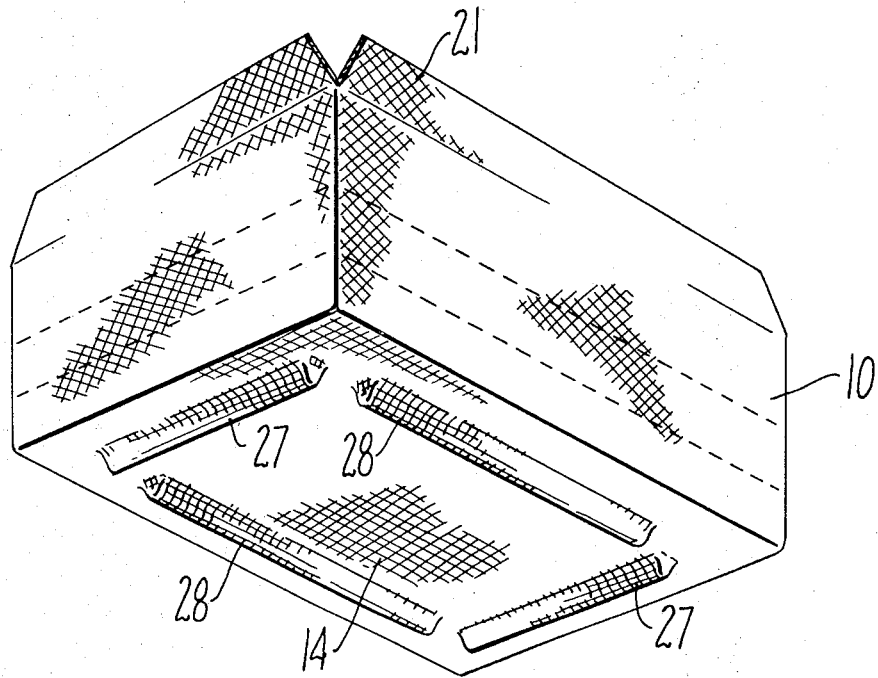
FIG. 4 is a perspective view of the basket showing the bottom and extended portions holding the bottom above the underlying surface.

Referring now more particularly to the drawing in which like elements are referred to with like numbers in the several views, and with particular reference to FIG. 1, the unit is fundamentally composed of a basket of open mesh woven wire so as to retain the contents while, at the same time, providing abundant air circulation to the fire. Woven wire mesh of ¼-inch spacing has been tested and found to be eminently satisfactory. Mesh of one-half inch to one-eighth inch is the optimum range, as the size of the openings is determined by lightweight strength, large enough without letting the food fall through, and not so small as to inhibit circulation of air.

The basket 10 may be formed in any suitable shape. The basket 10, shown here as rectangular, is open at the top, the top being provided by a similar woven wire flat member 11 which is the grill. The grill 11 rests atop the edge 12 of the basket 10. The basket 10 is provided with a continuous bottom 14, which is also of the same woven wire mesh.

The basket 10 normally carries three layers of material. The lowest layer A is the starter material. It is shown here as excelsior 15. Obviously, any material which will catch fire rapidly upon being ignited will be useful, such as balled, shredded, or rolled paper and the like. The second layer B is composed of wood chips or twig cuttings, preferably oak, apple, or hickory, but obviously it can be any material which will burn long enough to insure the igniting of the charcoal. The third layer C is preferably oak charcoal of from almond to walnut size. In the drawing, the second layer B is shown as wood chips 16 and the top layer C, the charcoal is numbered 17.

It may, on occasion, be advisable to leave the bottom layer open with a partition at the point indicated by the dotted line 18, leaving a tunnellike chamber 25 between the false bottom 18 and the bottom 14. When this is done, the wood chips or twigs 16 are retained by the false bottom 18 and an envelope or blotter soaked with an flammable or even crumpled paper (not shown), may be inserted in the tunnel and used for the igniting material.

As shown in FIG. 1, the sides and ends of the basket 10 are cut or otherwise angled inwardly as at 20. This is for the purpose of permitting the flaps 21 formed thereby, to be bent inwardly and/or upwardly as shown in FIG. 2. The positioning of these flaps is used to raise or lower the grill in relation to the fire and to support the grill in the adjusted position.

It will thus be observed that the barbecue package contains everything needed to barbecue food, make coffee or cook with a skillet, except the match to ignite it.

In order to be sure of a good draft and promote the chimney effect of the fire, separate angular end pieces 22 may be provided. When these are removed from the ends of the basket 10, the position in which they come in the package, and placed beneath the bottom 14 with their apex upward, as shown in FIG. 3, the basket and its contents rest thereon and are supported above an underlying surface 23. The raising of the basket 10 above the underlying surface provides a draft for the fire through the bottom 14.

For purposes of making the package even more handy and contain any possible dust or accumulation of materials passing through the screen 10, the entire package may be enclosed within a paper bag or wrapping an sealed therein.

The convenience of the barbecue package is quite apparent. One package, 8 inch X 10 inch X 4 inch is a suitable size for two or three persons, and if more people are involved, then additional units may be placed side by side to handle the simultaneous cooling, as space permits. The package of this size fits conveniently in a manila paper bag known as CZ 14.

Figure 5:
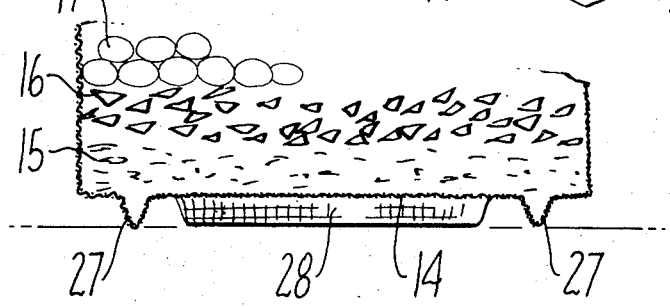
FIG. 5 is a schematic longitudinal section showing the raising of the basket from the supporting surface.

As shown in FIGS. 4 and 5 of the drawings, the corner brackets 22 may be eliminated by stamping into the bottom 14, transverse raised portions 27 and longitudinal raised portions 28. These provide sable supports for the basket 10 while raising the basket above the supporting surface. The effect is precisely the same as that provided by the angle members 22 shown in FIG. 3.

Figure 6:
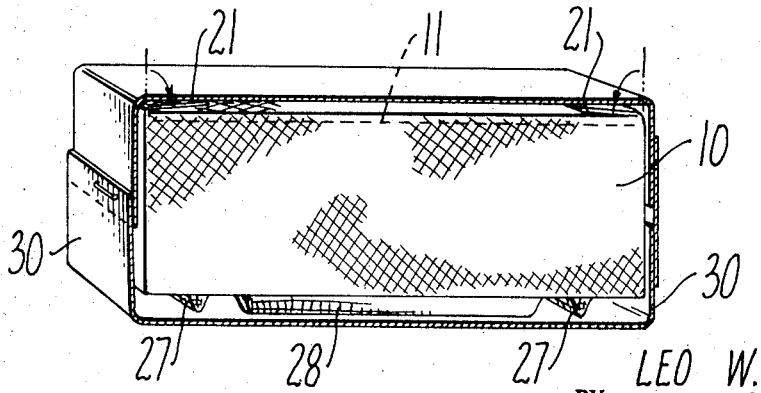
FIG. 6 is a diagrammatic perspective of the basket and contents wrapped in a wrapper or bag, with the side portion removed to show the packing.

The package is shown best in FIG. 6. In the most desirable of the preferred forms, the grill 11 rests directly on the charcoal 17 of layer C. The side flaps 21 are bent inwardly at right angles to hold the grill in place and the end flaps 21 are also bent inwardly at right angles to complete the holding and establish a shipping and handling rigidity for the package. The complete package in this form may then be inserted easily into the CZ 14 manila bag paper 30 and the package may be handled to any degree necessary without danger of soilage from the charcoal or any other commodity in the package.

OPERATION

The package is purchased complete from the retail store and it can be handled safely without in any way becoming involved with the dirt and mess of the charcoal. When it comes time for use, all that is necessary is to place the package in any suitable place such as in the fireplace, in a barbecue, on the ground, on bricks or any convenient safe position. A match, or other means, is used to ignite the excelsior 15 which flames immediately to ignite the kindling or chips 16. The excelsior burns with a quick, hot flame and by the time this is consumed all of the kindling over the entire area in layer B is ignited for the purpose of furnishing the required hot and more persistent flame to ignite the charcoal pieces 17. Because of the draft furnished on all four sides and the bottom of the basket 10, there is an abundant supply of oxygen and the ignition is both fast and complete. Within some 10 to 15 minutes the wood kindling in B is substantially consumed and the charcoal reduced to glowing embers suitable for barbecuing. Obviously, as the materials in layers A, B and C are consumed, the height within the basket 10 is reduced lowering the fire in relation to the grill 11. If the grill, by the time the charcoal is ready for barbecuing, is too far away from the fire for the purposes intended, then it is a simple matter to push the flaps 21 inwardly, using a tool and/or asbestos barbecue gloves to do so to prevent burning fingers and hands, to lower the grill toward the fire as indicated in FIG. 2.

If the barbecue package is wrapped in paper, then all that is necessary is to ignite the paper wrapping as it comes from the retail store and this will be consumed immediately, igniting the most flammable of the material, i.e., the excelsior of layer A or other starting material. In this manner the steps described above will be set in motion. In use, the angular end pieces 22 may be removed by tearing the bag only the amount required to remove them from the package, and none of the advantages of the package is lost in the doing.

The flame and the heat of the glowing charcoal will not only accomplish the cooking or barbecuing, but it will furnish the heat to consume the kindling in layer B and the excelsior or other starting material in layer A to complete ash, some of which is retained in the basket 10. In turn, the charcoal pieces will also be consumed to ash unless doused at the conclusion of the cooking. The fire of the charcoal lasts at least a full hour in the usual package, long enough to make the coffee, grill a full course dinner, and boil water for the dishes, if need be.

At the conclusion of use the fire may be doused in ant suitable manner and discarded. There is no fuss or muss, there is no kindling to find, there is no dirt from handling charcoal, and, since the entire basket is disposable, there is no grill to clean. Importantly there is no danger in use. The whole package, after use, may be disposed of since the cost of the package is so slight and favorably approximates the cost for the charcoal alone, normally used in barbecuing.

Assuming the package shown in FIG. 6, to start the barbecue all that is necessary is to locate the package top side up in the barbecue grill, in the fireplace, on a fireproof slab or any other suitable location. The package, as purchased in the retail store, enclosed within the paper bag is ignited at the bottom four corners. After the paper covering has been burned off and the excelsior burned to ash, then by use of the cooking tongs and a pair of asbestos gloves, the tabs 21 at the ends and at the sides are bent upwardly to release the grill, which is removed. The tabs are then bent inwardly slightly to support the grill 11.

Obviously, the paper wrapping may be removed before the fire is started, permitting the positioning of the grill 11 on the top edges of the basket 10.

While the wood chips 16 in layer B are burning to ash and igniting the charcoal 17 in layer C, one may place the coffee pot on the grill 11 and by the time the charcoal is in condition for barbecuing, the coffee making will be completed. If, at that time, it is judged that the grill 11 is too far above the glowing charcoal, the tabs 21 may be bent further inwardly to support the grill at the appropriate height, using the tools and asbestos gloves. During this time the excelsior 15 has burned to ash, the chips 16 have burned to ash and a bed is retained in the bottom of the basket for the glowing hot charcoal pieces. The charcoal pieces in this condition cannot spread out or the fire flattened out because they are confined evenly within the basket 10. The heat is continuous and even over the entire area beneath the grill 11, and no portion of the cooking is faster or slower than any other in any particular location.

It has been observed that a frequent cause of food poisoning is the barbecuing on a grill which has not been cleaned. Health authorities are well aware of the danger of using barbecue grills in public parks and camp sites, unless and until the grills have been thoroughly cleaned of decaying food particles from prior uses. In using the barbecue unit described herein there is no chance of food poisoning because there is only one use, and the barbecuing always starts with a new, unused grill.

One of the great advantages of the barbecue package is that the package contains everything necessary to enjoy the benefits of barbecuing without delays and without any of the bother and mess. Furthermore, since this is a self-contained package, barbecuing becomes practical and possible. There is no waste of fuel, there is no danger from starters such as lighter fluid, and the danger from fire, for any reason, except carelessness is all but eliminated.

After the fire has burned itself out and no coals or burning charcoal remains, or after dousing subsequent to use, the only clean up which is required is to step on the wire basket to flatten it and either bury it in the open or simply dispose of it in a garbage can.

This in this manner, all of the objectives, and more, of this invention can be accomplished.

I claim:

1. In a prepackaged fire and portable barbecue, a shaped basket of woven wire open at the top having spaced cuts from the top edge to provide flaps, flammable material packaged within said basket providing a barbecuing fire restrained within said basket, and a flat woven wire grill for barbecuing resting on the top edges of the said flaps, said flaps being bent inwardly or upwardly to adjust the height of the grill from the fire.

2. The prepackaged fire and portable barbecue of claim 1 having means to raise said basket from the supporting surface.

3. The prepackaged fire and portable barbecue of claim 1 wherein the fire material packaged within said basket is arranged in a plurality of layers including a first layer of hot burning quickly consumed material for igniting a second layer, a second layer of material having sustained burning for igniting the charcoal, and an upper layer of charcoal, the fire being ready for barbecuing within a short period of time.

4. The prepackaged fire and portable barbecue of claim 1 wherein the entire basket and grill are intended for and disposed of after a single use.

5. A prepackaged fire and disposable barbecue of claim 1 wherein the basket and its contents are wrapped in a flammable cover which is ignited to start the fire.

6. A prepackaged fire and disposable barbecue comprising a woven wire basket open at the top having a mesh opening of from ½ inch to ⅛ inch on all four sides and the bottom spaced cuts in the mesh from the top edge to form a series of flaps along the top, bendable inwardly and upwardly, fire material within said basket arranged in a plurality of layers including a bottom layer of high intensity fast burning material, a layer of sustained burning material and a top layer of charcoal, and a flat woven wire grill on top of said charcoal to hold it in place, said flaps being bent inwardly at 90° to hold the grill in place.

7. The prepackaged fire and disposable barbecue of claim 6 wherein the packed basket is enclosed in a flammable wrapper.

8. A prepackaged fire and disposable barbecue comprising a shaped woven wire basket open at the top, said basket having mesh openings from ½ inch to ⅛ inch on all four sides and bottom, said basket having sides extending below said bottom and forming a second bottom spaced therefrom and open at the ends, fire material contained within said basket including a layer of material having sustained burning for igniting the charcoal and a layer of charcoal, and a flat woven wire grill member packaged with said basket.

9. The prepackaged fire and disposable barbecue of claim 8 wherein the packed basket and grill are wrapped in a flammable paper for clean handling.

10. The prepackaged fire and disposable barbecue of claim 8 wherein the top marginal edge is cut vertically sufficient to form spaced flaps which may be bent inwardly or upwardly to adjust the height of the grill above the fire.